United States Patent
Fries et al.

(10) Patent No.: US 12,049,137 B2
(45) Date of Patent: Jul. 30, 2024

(54) VEHICLE COMPRISING AN ELECTRICALLY CONDUCTIVE VEHICLE PART THAT CAN BE USED AS A RESISTOR ELEMENT FOR CONVERTING ELECTRICAL ENERGY INTO HEAT

(71) Applicant: MAN Truck & Bus SE, Munich (DE)

(72) Inventors: Stefan Fries, Marktoberdorf (DE); Michael Bernath, Munich (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 17/622,216

(22) PCT Filed: Jun. 18, 2020

(86) PCT No.: PCT/EP2020/066854
§ 371 (c)(1),
(2) Date: Dec. 22, 2021

(87) PCT Pub. No.: WO2020/260112
PCT Pub. Date: Dec. 30, 2020

(65) Prior Publication Data
US 2022/0348083 A1 Nov. 3, 2022

(30) Foreign Application Priority Data
Jun. 28, 2019 (DE) ...................... 10 2019 004 557.2

(51) Int. Cl.
*B60L 1/02* (2006.01)
*B60L 7/10* (2006.01)

(52) U.S. Cl.
CPC ..................... *B60L 1/02* (2013.01); *B60L 7/10* (2013.01); *B60L 2200/18* (2013.01)

(58) Field of Classification Search
CPC ........... B60L 1/02; B60L 7/10; B60L 2200/18
See application file for complete search history.

(56) References Cited

U.S. PATENT DOCUMENTS 4,311,952 A * 1/1982 Mabuchi ............... H02J 7/0024
320/DIG. 22
9,954,259 B1 * 4/2018 Grace ..................... B60L 58/26
(Continued)

FOREIGN PATENT DOCUMENTS

CN 100543643 C * 9/2009 ......... H05K 7/20209
CN 102282051 A 12/2011
(Continued)

OTHER PUBLICATIONS

German Office Action issued in German Patent Application No. 102019004557.2 dated Mar. 9, 2020, 4 pages. No English translation available at this time.
(Continued)

*Primary Examiner* — Adam D Houston
(74) *Attorney, Agent, or Firm* — Weber Rosselli & Cannon LLP (57) ABSTRACT

The invention relates to a vehicle, preferably a commercial vehicle, a tour coach or a city bus. The electrically drivable vehicle (1) comprises an electric machine (2) that can be operated as a generator, an accumulator for electrical energy (3), an electrically conductive vehicle part, and a control device (5). The accumulator for electrical energy (3) is designed to receive electrical energy (4) from the electric machine (2) and/or to deliver electrical energy (4) to the electric machine (2). The control device (5) is designed, when at least one predetermined energy-dissipation condition is met, to divert electrical energy (4) generated when the electric machine (2) is being operated as a generator to the electrically conductive vehicle part for conversion into thermal energy, wherein the electrically conductive vehicle part is a vehicle frame (6) and/or a vehicle body (7) and/or a bodywork (8).

13 Claims, 4 Drawing Sheets

(56) References Cited

U.S. PATENT DOCUMENTS

| | | | |
|---|---|---|---|
| 2003/0057035 A1* | 3/2003 | Noll | F16D 65/22 |
| | | | 188/73.37 |
| 2010/0051359 A1 | 3/2010 | Fushiki et al. | |
| 2016/0152157 A1* | 6/2016 | Li | B60L 3/12 |
| | | | 701/22 |
| 2016/0167525 A1* | 6/2016 | Widmer | F04D 29/547 |
| | | | 415/211.2 |
| 2020/0339010 A1* | 10/2020 | Villanueva | B64D 27/24 |
| 2021/0003635 A1* | 1/2021 | Nguyen | B60L 1/14 |
| 2021/0016837 A1* | 1/2021 | Moss | B62D 21/157 |
| 2021/0053689 A1* | 2/2021 | Lynn | H01M 10/486 |
| 2022/0348083 A1* | 11/2022 | Fries | B60L 1/02 |
| 2022/0363143 A1* | 11/2022 | Faruque | B60L 50/66 |

FOREIGN PATENT DOCUMENTS

| | | | | | |
|---|---|---|---|---|---|
| CN | 102574447 | A | * | 7/2012 | ............ B60L 1/003 |
| CN | 108064206 | A | * | 5/2018 | ............ B60K 11/06 |
| CN | 109677428 | A | * | 4/2019 | ............ B60L 7/10 |
| CN | 110460123 | A | * | 11/2019 | |
| CN | 114103904 | A | * | 3/2022 | ............ B60L 1/003 |
| DE | 19860616 | A1 | * | 7/2000 | ............ B60L 7/02 |
| DE | 10226308 | A1 | | 12/2003 | |
| DE | 102007021989 | A1 | | 11/2007 | |
| DE | 102009054875 | A1 | | 6/2011 | |
| DE | 102009054875 | A1 | * | 6/2011 | ............ B60L 7/003 |
| DE | 102017210750 | A1 | * | 12/2018 | ............ B60L 1/003 |
| DE | 102021202091 | A1 | * | 9/2022 | ............ B60L 7/02 |
| EP | 3778285 | A1 | * | 2/2021 | ............ B60L 1/003 |
| JP | 2009219220 | A | * | 9/2009 | |
| KR | 970036355 | A | * | 7/1997 | |
| KR | 100971463 | B1 | * | 7/2010 | |
| KR | 20160000185 | A | * | 1/2016 | |
| RU | 2688563 | C1 | * | 5/2019 | ............ B60H 1/20 |
| WO | 2008147305 | A1 | | 12/2008 | |
| WO | WO-2018001590 | A1 | * | 1/2018 | ............ B60L 3/003 |
| WO | WO-2020260112 | A1 | * | 12/2020 | ............ B60L 1/003 |
| WO | WO-2022095013 | A1 | * | 5/2022 | |
| WO | WO-2022122382 | A1 | * | 6/2022 | ............ B60L 7/22 |

OTHER PUBLICATIONS

International Search Report with English translation and Written Opinion issued in PCT application No. PCT/EP2020/066854 dated Sep. 28, 2020.
Notification of the First Office Action issued in Chinese Application No. 202080047269.9 dated Feb. 28, 2024 with English translation.

* cited by examiner

VEHICLE COMPRISING AN ELECTRICALLY CONDUCTIVE VEHICLE PART THAT CAN BE USED AS A RESISTOR ELEMENT FOR CONVERTING ELECTRICAL ENERGY INTO HEAT

CROSS-REFERENCE TO RELATED APPLICATIONS

This application is a 371 application of PCT/EP2020/066854 filed Jun. 18, 2020, which claims benefit of and priority to German Patent Application Serial No. DE102019004557.2 filed Jun. 28, 2019, the disclosures of the above-identified applications are hereby incorporated by reference in their entirety.

DESCRIPTION

The present disclosure relates to a vehicle, preferably a commercial vehicle, for example a coach or a city bus.

Electrically drivable vehicles are known in the field which have an electric machine which can be operated as a motor and a generator or have a combination of an electric machine and an internal combustion engine (hybrid applications) for driving the vehicle, as well as a storage device for electrical energy which is designed to absorb electrical energy from the electric machine and/or to emit electrical energy to the electric machine. In this case, it is known to operate the electric machine as a generator in order to recover kinetic energy of the vehicle. In this case, the electric machine converts kinetic energy into electrical energy, typically for supporting a desired braking operation. The recovered electrical energy is usually supplied to the storage device for electrical energy. However, if the storage device for electrical energy reaches its capacity limit or if there is a technical defect, the electrical energy generated by a generator can no longer be absorbed and must be dissipated in another way.

It is known from the prior art that in the case of a full or defective energy storage device, the electrical energy is converted into heat energy via brake resistors. In the case of brake resistors, a defined short circuit is generated via a conductive element. The resulting thermal energy is then transferred to the cooling medium and dissipated. In order to dissipate this heat, the brake resistors must presently be cooled via additional cooling circuits. This leads to additional costs and energy consumption.

In this context, document DE 102 26 308 A1 describes an electrodynamic drive device for a motor vehicle with an internal combustion engine, with an electric machine which can be operated as a motor/generator, with an electrical energy storage device and with a control and regulation device which controls the state of charge of the electrical energy storage device and identifies if a predeterminable state of charge of the electrical energy storage device has been reached. If this predeterminable state of charge is reached, the electrodynamic drive device is connected to at least one electrical consumer and the excess energy is supplied to the electrical consumer. One disadvantage which can be seen from the technical teaching of DE 102 26 308 A1 is that the electrical consumers which are connected downstream for discharging the electrical energy can be damaged by electrical overload. Furthermore, operation of specific electrical consumers can be undesired in certain situations (e.g. operating the passenger compartment cooling system in winter or the passenger compartment heater in summer, etc.), such that a discharge of electrical energy to these consumers in these situations can only take place conditionally. Furthermore, in particular in the case of heavy commercial vehicles in which the necessary powers for continuous braking are at several 100 kW, in the case of driving downhill, a very large amount of excess electrical energy can conceivably be generated which cannot be dissipated in full to electrical consumers of this type or cannot be fed back to the electrical energy storage device.

It is therefore the object of the present disclosure to provide a technique for converting excess electrical energy in vehicles in an operationally safe manner, with which technique the disadvantages of known techniques can be avoided. In particular, the object of the present disclosure is to provide an approach for converting excess energy which can be realized with little effort in terms of construction and in a cost-effective manner.

These objects are achieved by a vehicle with the features of the independent claims. Advantageous embodiments and applications of the present disclosure are the subject matter of the dependent claims and are explained in greater detail in the subsequent description with partial reference to the figures.

According to a general aspect of the present disclosure, a vehicle is provided, comprising an electric machine, a storage device for electrical energy, an electrically conductive vehicle part and a control device.

The electric machine can be designed as a direct current machine or a three-phase machine, for example. The electric machine can be an electric machine for driving the vehicle. However, in principle, all variations of electric machines are conceivable. The electric machine can be operated as a generator. In addition to generator operation, the electric machine can be designed to be able to be operated as a motor, preferably for driving the vehicle. During motor operation, electrical energy is absorbed by the electric machine, whereas during generator operation, electrical energy is emitted by the electric machine.

The storage device for electrical energy, also referred to as electrical energy storage device hereinafter, is designed to absorb electrical energy from the electric machine, for example during generator operation, and/or to emit electrical energy to the electric machine, for example during motor operation of the electric machine. The storage device for electrical energy can be designed as an accumulator storage device, for example as a Li-ion battery, as a super capacitor storage device, as a hydraulic storage device, a flywheel or as a hybrid energy storage device with accumulator elements and super capacitor elements.

The electrically conductive vehicle part can consist of an electrically conductive metal, for example.

The control device is designed, when at least one predetermined condition is met, to discharge electrical energy which is generated during generator operation of the electric machine to the electrically conductive vehicle part. This can be electrical energy which cannot be fed back into the electrical energy storage device and/or excess electrical energy, for example. This condition is referred to as an energy dissipation condition hereinafter. The energy dissipation condition is preferably set in such a way that it is met if an operating situation of the vehicle is present in which excess electrical energy is generated by the electric machine which can no longer be stored in the electrical energy storage device and instead must be dissipated.

According to the present disclosure, the electrically conductive vehicle part is a vehicle frame, a vehicle body and/or a chassis of the vehicle or at least an electrically conductive part or segment of the vehicle frame, of the vehicle body and/or of the vehicle chassis. In this case, the control device can be designed to discharge the electrical energy which is generated during generator operation of the electric machine as a short circuit current by triggering a short circuit with the electrical vehicle part which serves as a resistor element.

The vehicle frame can be designed as a ladder frame which comprises two side members connected to cross beams, for example.

According to the underlying understanding here, the vehicle body can also be any component which is mounted on a basic vehicle defined by the manufacturer (OEM) of the vehicle. Merely by way of example, an electrically conductive vehicle body or electrically conductive parts thereof may comprise: any form of an electrically conductive structure, for example superstructures from the agricultural, forestry and waste management sectors, for example tank/silo, woodcutters, waste collectors, superstructures for construction sites and crane vehicles, for example dump trucks, crane application, superstructures for special-purpose vehicles, for example for the fire department, etc.

Correspondingly, a defined short circuit via existing vehicle parts, such as the electrically conductive vehicle frame or an electrically conductive vehicle body, for example, can be represented for dissipating excess electrical energy.

In other words, when the predetermined energy dissipation condition is met, the vehicle frame, the vehicle body and/or the chassis is used as a rheostatic brake. Put another way, an existing electrically conductive vehicle part is used as a brake resistor, such that it is not necessary to provide an additional brake resistor which has the sole function of serving as a brake resistor.

One particular advantage of this is that owing to the low heating due to the large thermal mass and good heat dissipation through convection as a result of the relatively large surface area, an additional cooling circuit, as well as additional components, such as a separate brake resistor, can be dispensed with or reduced in scope. This relieves an existing cooling system and cost advantages are achieved. One particular advantage is therefore that the additional element of the brake resistor can be dispensed with and the cooling system can thus be significantly relieved.

According to one particularly preferred embodiment, the vehicle is a commercial vehicle, for example a heavy goods vehicle, and the electrically conductive vehicle part which is used for discharging excess energy is the vehicle frame and/or vehicle body of the commercial vehicle. It has already been stated previously that in particular in the case of heavy commercial vehicles in which the necessary powers for continuous braking are at several 100 kW, in the case of driving downhill during generator brake operation of the electric machine, a very large amount of excess electrical energy is conceivably generated which must be dissipated in the case of a full or defective energy storage device. Dissipating this excess electrical energy and converting it into thermal energy via the vehicle frame and/or the vehicle body therefore enables a particularly cost-effective approach to providing a rheostatic brake.

According to one further aspect of the present disclosure, the electrical energy which is discharged to the electrically conductive vehicle part can be emitted directly to the environment as thermal energy. Discharging the electrical energy to the environment as thermal energy can take place directly via the vehicle part without an intermediate cooling circuit. This makes it possible to save the costs of an additional cooling circuit, which also has maintenance advantages.

The use of the vehicle frame, the vehicle body and/or the chassis in order to discharge excess energy also has advantages compared to the known solutions with respect to the overload safety of the system. In particular, in the case of a prolonged discharge of a large amount of electrical energy from the electric machine to the vehicle frame and/or the vehicle body and/or the chassis, they do not typically heat up to a safety-relevant extent owing to their mass and thermal inertia. In addition, the vehicle frame and/or the vehicle body and/or the chassis are not electrified consumers which can be damaged by strong electrical overload. Overall, the aspects described result in cost advantages and increased operational safety as well as reduced installation space requirements.

According to one embodiment, the predetermined energy dissipation condition can be met if a state of charge of the storage device for electrical energy exceeds a predetermined threshold value. The predetermined energy dissipation condition can preferably be met if the storage device for electrical energy is fully charged. The term "fully charged", as it is understood in the sense of the present disclosure, indicates that a predetermined, preferably reasonable capacity limit of the storage device for electrical energy is reached, such that an additional absorption of electrical energy is no longer possible. In this case, reference should be made to the fact that this reasonable capacity limit may vary depending on the particular application, since electrical energy storage devices are usually not fully loaded and unloaded due to the lifespan. Furthermore, the predetermined, preferably reasonable capacity limit can also depend on whether thermal limits of the storage device for electrical energy are reached. Advantages of this embodiment can be seen in particular in the fact that the storage device for electrical energy can be operated in an optimum range and can be protected against overload.

According to one further aspect of the present disclosure, the predetermined energy dissipation condition can further be met if there is a technical defect in the storage device for electrical energy. The term "technical defect", as it is understood in the sense of the present disclosure, indicates that the storage device for electrical energy can no longer fulfill its function, at least in part. This embodiment offers the advantage that a potentially safety-critical supply of electrical energy to a defective storage device for electrical energy can be prevented. Overall, this embodiment further increases the safety of the system.

According to one further embodiment, the control device can be designed, when the predetermined energy dissipation condition is met, to use some of the electrical energy for operating at least one electrified auxiliary unit. This embodiment has advantages, since the electrical energy which is necessary for the operation of the electrified auxiliary units can be guaranteed at least in part by electrical energy which cannot be fed back and therefore excess electrical energy. Overall, there are advantages with respect to the overall efficiency of the vehicle.

According to one further aspect of the embodiment described above, the at least one electrified auxiliary unit can be a fan, a cooler, an electrical passenger compartment heater, a front window heater, a rear window heater, an air compressor, a water pump, a hydraulic pump, an air-conditioning compressor and/or an oil pump.

The vehicle can be a purely electrically operated vehicle or a vehicle which is designed as a hybrid vehicle and can additionally be driven by a combustion engine, for example.

The preferred embodiments and features of the present disclosure described previously can be combined with one another as desired. Further details and advantages of the present disclosure are described hereinafter with reference to the accompanying drawings. In the drawings:

Identical or functionally equivalent elements are referred to using the same reference numbers in all of the figures and are not described separately in some cases.

Figure 1:
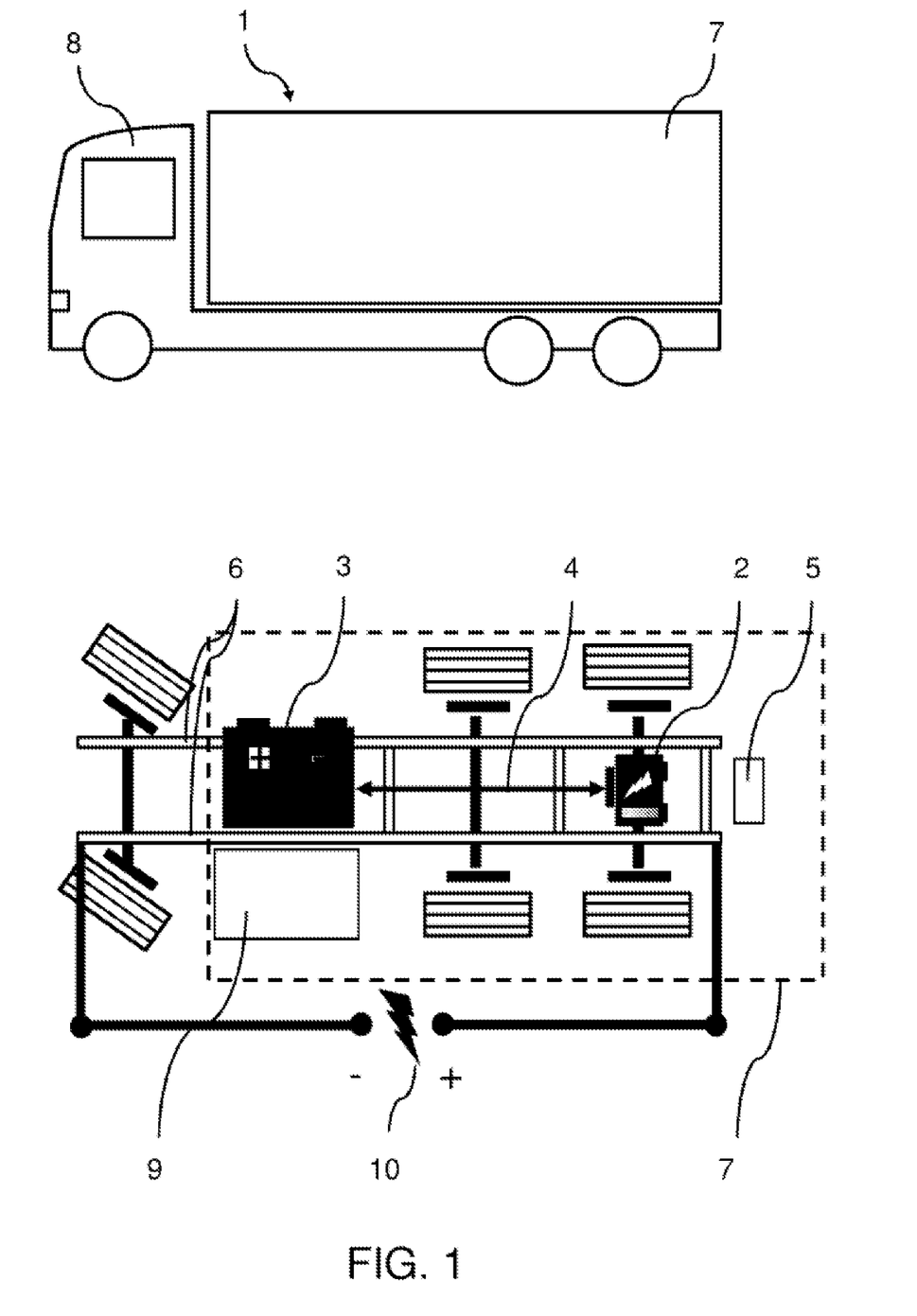
FIG. 1 shows a highly schematic representation of the body of the vehicle according to one embodiment of the present disclosure.

The two views in FIG. 1 are highly schematic views of the vehicle according to one embodiment of the present disclosure, which should merely serve as a clear representation of part of the components of this embodiment of the present disclosure. For the sake of clarity, representation of further essential components of this embodiment of the present disclosure has been dispensed with.

The top view in FIG. 1 shows a schematic side view of an electrically drivable commercial vehicle 1 according to one embodiment of the present disclosure. In this highly schematic side view, a vehicle body 7 and a driver's cab 8 can be identified. The driver's cab 8 is mounted on a lower part of the commercial vehicle 1 which includes the vehicle frame and which connects three axles of the towing vehicle 8 of the commercial vehicle 1.

The bottom view in FIG. 1 shows a highly schematic and simplified plan view of the lower part of the commercial vehicle 1. In order to emphasize the features of the present disclosure more efficiently, only the components of the commercial vehicle which are important for the explanation of the present disclosure are represented in this case. Further switches connected to the vehicle electrical system, such as switches, inverters, etc. which can be designed in the usual way, are not represented. The electrically drivable commercial vehicle 1 represented comprises an electric machine 2, for example arranged on a rear axle of a towing vehicle, which generates the driving power of the commercial vehicle 1. The electric machine 2 is designed to emit electrical energy 4 during motor operation and/or to absorb electrical energy 4 during generator operation. The electric machine 2 can be designed as a three-phase or direct current motor, for example.

In the exemplary embodiment shown, the electric machine 2 is connected in a driving manner to the second rear axle of the towing vehicle of the vehicle 1. However, the electric machine 2 can also be realized as wheel hub motors, for example, which are directly connected to wheels of the vehicle 1 in a driving manner.

The electric machine 2 is further electrically connected to a storage device 3 for electrical energy, hereinafter referred to briefly as electrical energy storage device 3. In the exemplary embodiment shown in FIG. 1, the electrical energy storage device 3 is by way of example designed as an accumulator storage device or battery storage device, for example as a Li-ion battery. The electrical energy storage device 3 is designed to emit electrical energy 4 to the electric machine 2 and/or to absorb it from the electric machine 2. The electrical energy storage device 3 and the electric machine 2 are electrically coupled to one another via a vehicle electrical system, for example a high-voltage vehicle electrical system, in a manner known per se (not represented).

The electrically drivable commercial vehicle 1 further has an electrically conductive vehicle frame 6 in the form of a ladder frame which comprises two side members connected to cross beams. Furthermore, a control device 5 is provided, for example in the form of a control apparatus. The control device 5 is designed, when at least one predetermined energy dissipation condition is met, to not supply the electrical energy 4 which is generated during generator operation of the electric machine 2 to the electrical energy storage device 3, but rather to discharge it to the vehicle frame 6. For this purpose, the control apparatus generates a deliberate short circuit via the vehicle frame 6. The vehicle frame 6 therefore not only serves as a load-bearing vehicle part, but rather it is simultaneously used as a brake resistor.

Using the schematic representation in FIG. 2, the mode of operation of the electrically drivable vehicle 1 is explained hereinafter according to one embodiment of the present disclosure. However, it is emphasized that instead of the exemplary embodiment shown here and described hereinafter, the motor drive does not have to be electric, but rather can alternatively or additionally also be realized by an internal combustion engine with corresponding electrical brake and brake resistor.

During optional motor operation, the electric machine 2 absorbs electrical energy 4 from the storage device for electrical energy 3. During generator operation, the electric machine 2 emits electrical energy 4.

When the predetermined energy dissipation condition is met, a control device 5 triggers the discharge of the electrical energy 4 which is generated by the electric machine 2 to the electrically conductive vehicle frame 6 during generator operation of the electric machine 2. The predetermined energy dissipation condition is met in the present exemplary embodiment if the state of charge of the storage device for electrical energy 3 exceeds a threshold value, for example if the electrical energy storage device 3 is fully charged or if the electrical energy storage device 3 is defective. If the electrical energy storage device 3 is therefore not fully charged and is fully operational in the present exemplary embodiment during generator operation of the electric machine 2, electrical energy 4 which is generated by the electric machine 2 is supplied to the electrical energy storage device 3 via a high-voltage vehicle electrical system shown in FIG. 4, for example. However, within the context of monitoring the state of charge of the electrical energy storage device 3, if the control device 5 identifies that it is fully charged or is defective, the control device 5 directs excess electrical energy 4 in the form of a short circuit current to the vehicle frame 6, which serves as a resistor element, namely as a rheostatic brake, during generator operation by triggering a deliberate short circuit. The generation of a deliberate short circuit 10 of the positive and negative terminal by way of the control device 5 is represented schematically in FIG. 1. In this case, the short circuit current is produced via at least two electrical connections. The connection positions determine the electrical resistance value of the electrical connection and must be applied in such a way that they comply with the design of the required brake resistor, for example with respect to endurance and peak braking power. In principle, any (partial) section of the vehicle frame 6 or vehicle body 7 can function as a resistor element. Where the contact takes place on the vehicle frame 6 or vehicle body 7 plays a minor role in this case. It is positive for the mode of operation to maximize the distance between the contacts. In this case, the connections can be designed in different ways, for example as terminals, bolts with threads or welded. Possible components for implementing the electrical connection are, among other things, fuses, contactors, switches, converters, so-called brake choppers and/or capacitors.

The excess electrical energy supplied to the vehicle frame 6 via the short circuit current is converted into thermal energy in the vehicle frame 6, since it acts as an ohmic resistor, and is emitted from there to the environment. Owing to the low heating due to the large thermal mass of the vehicle frame 6 and the good heat dissipation through convection as a result of the relatively large surface area of the vehicle frame 6, it does not have to be cooled when used as a rheostatic brake, such that an additional cooling circuit as well as additional components which function as a brake resistor can be dispensed with. In particular in the case of heavy commercial vehicles which generate large amounts of excess energy in the case of longer downhill rides during generator operation of the electric machine, large amounts of excess energy of this type can thus be dissipated in a reliable and cost-effective manner. Alternatively or additionally, the excess energy can also be supplied in a similar manner to an electrically conductive vehicle body 7 which serves as a brake resistor. This is also represented in FIG. 2.

In one further embodiment, excess electrical energy can alternatively or additionally be discharged by way of a deliberate short circuit with the vehicle body or at least with one or a plurality of electrically conductive parts of the vehicle body, such that the vehicle body or electrically conductive parts thereof function as a brake resistor. Exemplary parts or components of the vehicle body which are particularly suitable for this comprise any form of an electrically conductive structure, for example superstructures from the agricultural, forestry and waste management sectors (e.g. tank/silo, wood-cutters, waste collectors), superstructures for construction sites and crane vehicles (e.g. dump trucks, crane application), superstructures for special-purpose vehicles (e.g. fire department).

Figure 2:
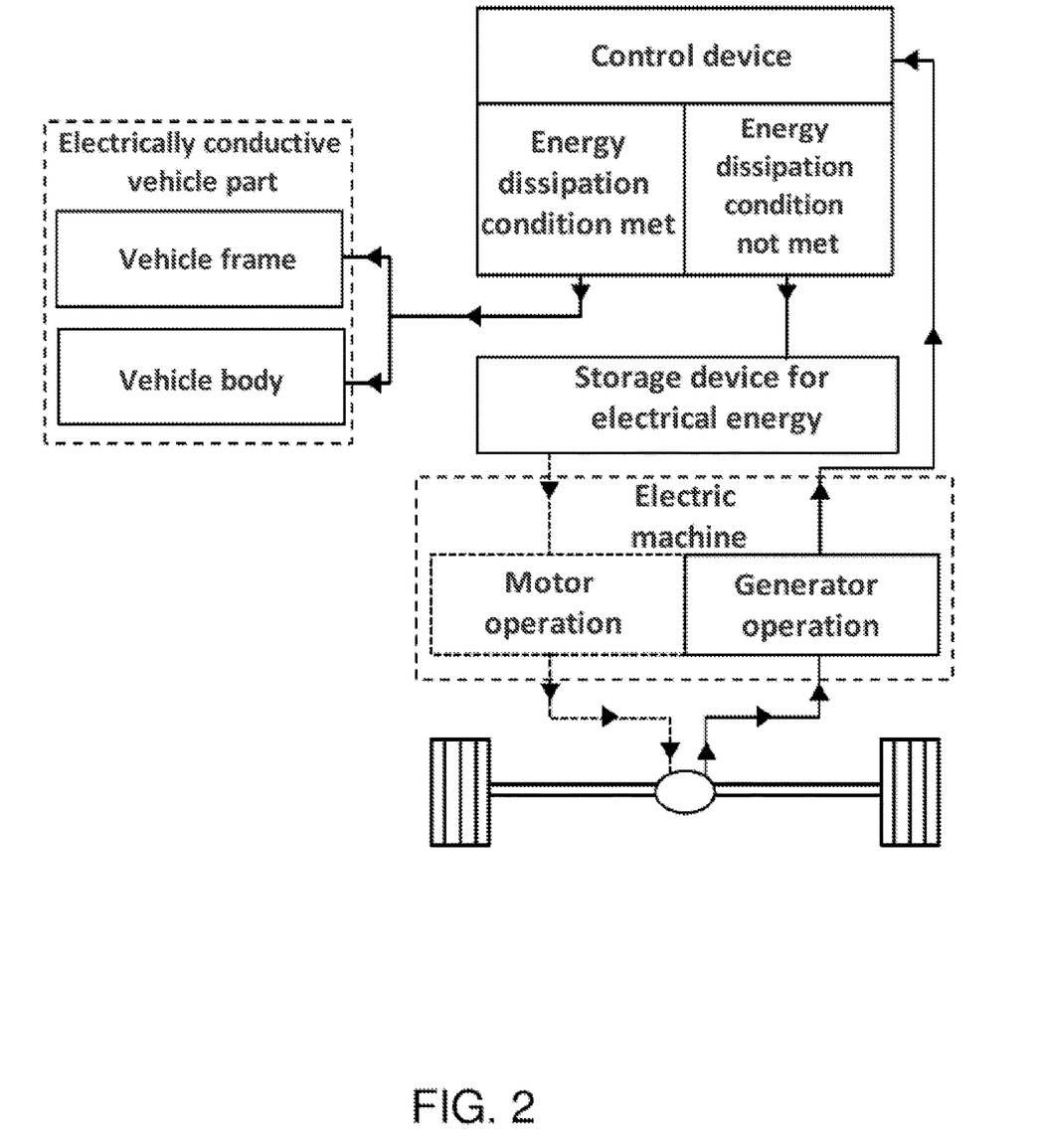
FIG. 2 shows a schematic representation of the mode of operation of the vehicle according to one further embodiment of the present disclosure.
Figure 3:
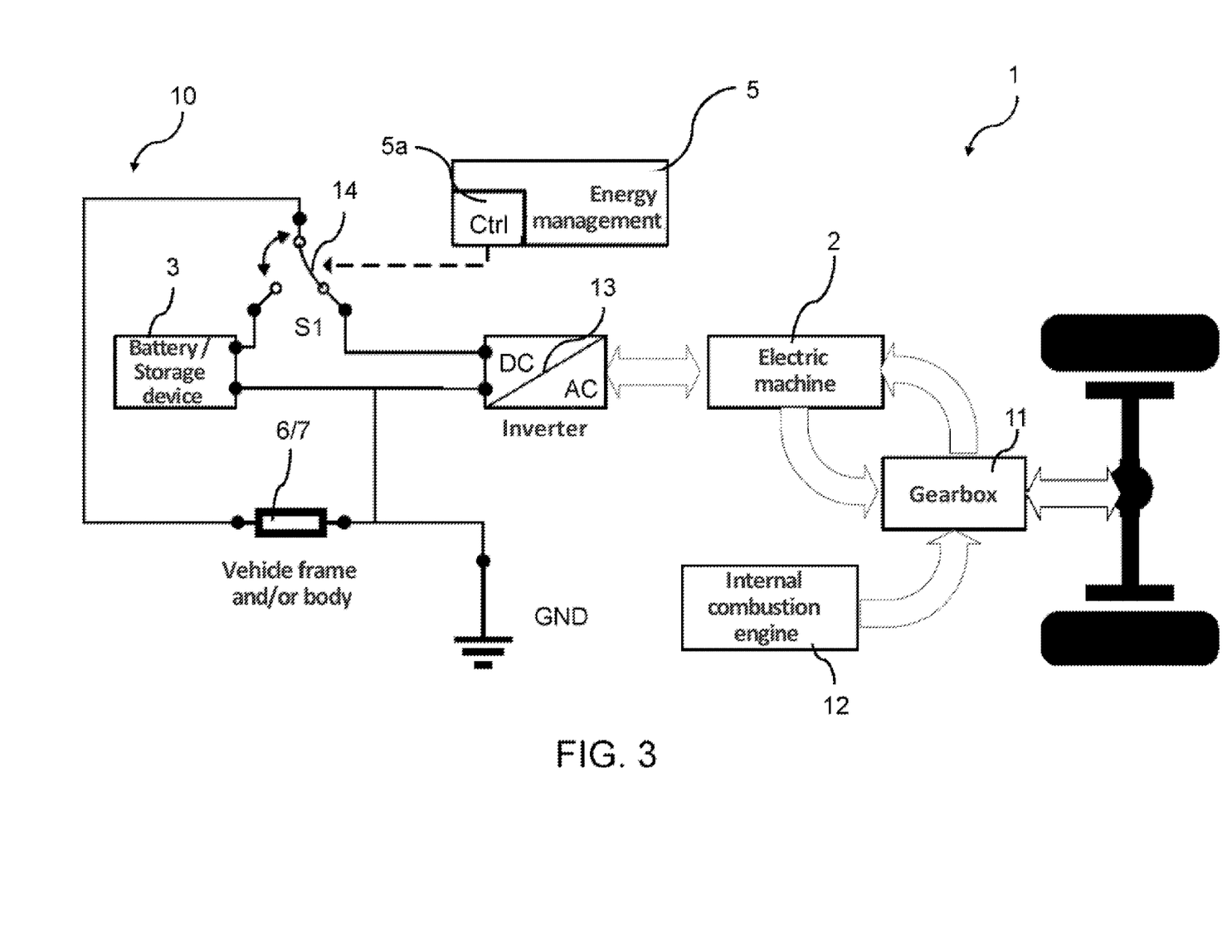
FIG. 3 shows a schematic representation of a low-voltage vehicle electrical system of a vehicle according to one further embodiment of the present disclosure.

FIG. 3 illustrates an exemplary realization for the basic principle shown in FIGS. 1 and 2 in the case of a low-voltage vehicle electrical system in order to be able to optionally discharge excess electrical energy to the vehicle frame and/or body. For this purpose, FIG. 3 shows a schematic representation of a low-voltage vehicle electrical system of a vehicle according to one further embodiment of the present disclosure.

A low-voltage vehicle electrical system is understood to mean a vehicle electrical system with a nominal voltage of up to 60V, for example vehicle electrical systems with nominal voltages of 12V, 24V and/or 48V. In a manner known per se, the vehicle electrical system can also comprise two or more sub vehicle electrical systems which have different nominal voltages (not represented).

In the exemplary embodiment shown, the drive can take place by way of an electric machine 2 and/or an optional internal combustion engine 12, the driving power of which is transmitted to a driven axle via an optional gearbox 11. If the electric machine 2 is braked by lowering the speed, the electric machine 2 transitions to generator operation. During generator operation, the electric machine 2 generates alternating current which is converted into direct current in an inverter 13.

A control device 5 is responsible for energy management. As already described in relation to FIG. 2, the control device 5 monitors whether a predetermined energy dissipation condition is met, for example whether a predetermined capacity limit of the electrical energy storage device 3 is reached. As already explained previously, the predetermined capacity limit may be different for different operating phases and may also take into account thermal limits of the electrical energy storage device 3.

The control device 5 is designed, when at least one predetermined energy dissipation condition is met which indicates that excess electrical energy cannot be stored in the electrical energy storage device, to discharge the electrical energy which is generated during generator operation of the electric machine 3 as a short circuit current by triggering a short circuit with the electrical vehicle frame 6 and/or vehicle body 7 which serves as a brake resistor. For this purpose, the control device 5 controls a controller 5a which is in signal connection with an electrical switch 14, in order to disconnect the electrical energy storage device 3 from the vehicle electrical system and instead to direct the excess electrical energy to an electrically conductive part of the electrical vehicle frame 6 and/or vehicle body 7 via the short circuit 10. FIG. 3 shows the switch 14 already in the switch position in which the short circuit current is enabled. After the energy dissipation condition is no longer present, the switch is switched again, such that the short circuit 10 is interrupted and the electric machine 3 is instead connected to the vehicle electrical system again. This embodiment is particularly suitable for low-voltage vehicle electrical systems.

Figure 4:
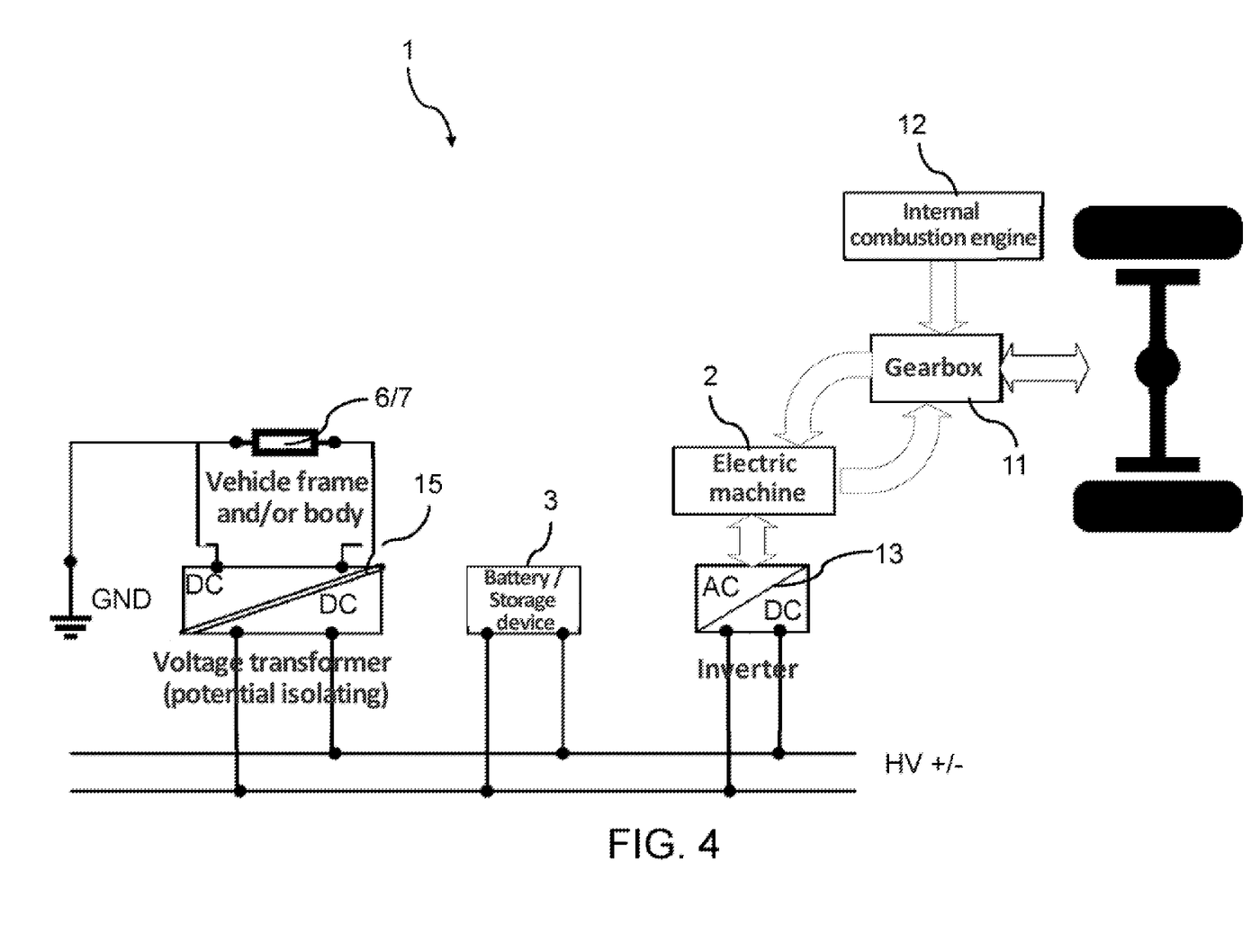
FIG. 4 shows a schematic representation of a high-voltage vehicle electrical system of a vehicle according to one further embodiment of the present disclosure.

FIG. 4 illustrates an alternative embodiment in the case of a high-voltage vehicle electrical system, the nominal voltage of which is in the range of several hundred volts. The components with identical reference numbers correspond to those from FIG. 3 and are therefore not described in greater detail. The special feature of this embodiment is that the short circuit is now controlled via a potential isolating voltage transformer 15, instead of via the switch 14, in order to convert the electrical energy to be dissipated to a lower voltage level before it is discharged to the vehicle frame 6 and/or vehicle body 7, which is advantageous from a safety point of view, so that no high voltage is applied to the vehicle frame 6 and/or vehicle body 7.

The control device 5 (not represented here) is, in turn, designed for monitoring whether at least one predetermined energy dissipation condition, which indicates that excess electrical energy cannot be stored in the electrical energy storage device, is met. If this is the case, the control device 5 controls the voltage transformer 15 in such a way that it generates an electrical short circuit with the vehicle frame 6 and/or vehicle body 7. The potential isolating voltage transformer 15 therefore serves as a switch here with simultaneous voltage transformer function, in order to down convert the high voltage (HV) to a low voltage (LV) if the short circuit current is generated.

The high-voltage vehicle electrical system can have a so-called brake chopper as a further optional component. If the kinetic energy of the vehicle converted into electrical energy is not fed back into the vehicle electrical system via the inverter 13 during generator operation, for example, the intermediate circuit capacitors absorb this energy. The voltage of the intermediate circuit increases as a result. If the intermediate circuit voltage becomes too great, the inverter 13 protects itself by switching off. In order to avoid this brake interruption, the brake chopper can be used, which becomes active when the permissible intermediate circuit voltage is exceeded and switches the brake resistor 6 or 7 to the intermediate circuit and thus converts the excess energy into heat.

If the system is braked, the excess energy flows back into the intermediate circuit via the power amplifier in the form of generator current. If this voltage exceeds a threshold voltage, the brake chopper is electronically switched on. The excess energy is then converted almost completely into thermal energy via the connected brake resistor. In this case, the limiting element is the brake resistor, since a large amount of energy is converted into heat in it.

Safety measures are dependent on the technical design and must be evaluated according to the design and implemented taking into account the prior art and the applicable standards, rules and regulations.

Despite the fact that the present disclosure has been described with reference to specific exemplary embodiments, it is clear to the person skilled in the art that various changes may be carried out and equivalents may be used as substitutes, without departing from the scope of the present disclosure. Consequently, the present disclosure should not be limited to the exemplary embodiments disclosed, but rather should comprise all exemplary embodiments which fall within the scope of the accompanying claims. In particular, the present disclosure also claims protection for the subject matter and the features of the subclaims irrespective of the claims which are referred to.

LIST OF REFERENCE NUMBERS 1 vehicle
2 electric machine
3 storage device for electrical energy
4 electrical energy
5 control device
5a controller
6 vehicle frame
7 vehicle body
8 driver's cab
9 electrified auxiliary units
10 deliberate electrical short circuit
11 gearbox
12 internal combustion engine
13 inverter
14 electrical switch
15 voltage transformer

The invention claimed is:

1. A vehicle comprising
an electric machine which can be operated as a generator,
a storage device for electrical energy which is designed to absorb electrical energy from the electric machine or to emit electrical energy to the electric machine
an electrically conductive vehicle part, and
a control device which is designed, when at least one predetermined energy dissipation condition is met, to discharge electrical energy which is generated during generator operation of the electric machine to the electrically conductive vehicle part for converting it into thermal energy, wherein the electrically conductive vehicle part is a vehicle frame or a chassis.

2. The vehicle as claimed in claim 1, wherein the vehicle is a commercial vehicle.

3. The vehicle as claimed in claim 1, wherein the predetermined energy dissipation condition is met if a state of charge of the storage device for electrical energy exceeds a predetermined threshold value.

4. The vehicle as claimed in claim 1, wherein the predetermined energy dissipation condition is met if the storage device for electrical energy is fully charged.

5. The vehicle as claimed in claim 1, wherein the predetermined energy dissipation condition is met if there is a technical defect in the storage device for electrical energy.

6. The vehicle as claimed in claim 1, wherein the control device is designed to discharge the electrical energy as a short circuit current by triggering a short circuit with the electrical vehicle part which serves as a resistor element.

7. The vehicle as claimed in claim 1, wherein the electrical energy which is discharged to the electrically conductive vehicle part is emitted directly to the environment as thermal energy.

8. The vehicle as claimed in claim 1, wherein the electrical energy discharged to the electrically conductive vehicle part is emitted directly to the environment as thermal energy without an intermediate cooling circuit.

9. The vehicle as claimed in claim 1, wherein the control device is designed, when the predetermined energy dissipation condition is met, to use the vehicle frame or the vehicle body or the chassis as a rheostatic brake.

10. The vehicle as claimed in claim 1, wherein the control device is designed, when the predetermined energy dissipation condition is met, to use some of the electrical energy for operating at least one electrified auxiliary unit.

11. The vehicle as claimed in claim 10, wherein the at least one electrified auxiliary unit is a fan, a cooler, an electrical passenger compartment heater, a front window heater, a rear window heater, an air compressor, a water pump, a hydraulic pump, an air-conditioning compressor or an oil pump.

12. The vehicle as claimed in claim 1, wherein the vehicle is a commercial vehicle and the electrically conductive vehicle part is the vehicle frame or the vehicle body.

13. The vehicle as claimed in claim 12, wherein the commercial vehicle is a heavy goods vehicle, coach or city bus.

* * * * *